United States Patent [19]

Bertram et al.

[11] 4,015,884
[45] Apr. 5, 1977

[54] CENTER-FREE ONE-ROW WIRE BALL BEARING

[75] Inventors: Johannes Bertram, Unna-Billmerich; Heinz Wolzenburg, Dortmund, both of Germany

[73] Assignee: Hoesch Werke Aktiengesellschaft, Dortmund, Germany

[22] Filed: Dec. 17, 1975

[21] Appl. No.: 641,752

[30] Foreign Application Priority Data

Dec. 19, 1974  Germany .......................... 2460120

[52] U.S. Cl. ............................................. 308/216
[51] Int. Cl.² ...................................... F16C 33/58
[58] Field of Search ........... 308/188, 201, 216, 235

[56] References Cited

UNITED STATES PATENTS 2,845,311  7/1958  Cobb ................................. 308/216
3,332,728  7/1967  Gibson ........................... 308/216 X
3,336,057  8/1967  Bloomquist .................... 308/216 X
3,700,845  10/1972  Jonsson ............................. 308/216

Primary Examiner—Robert R. Song
Assistant Examiner—Gene A. Church
Attorney, Agent, or Firm—Walter Becker

[57] ABSTRACT

A center-free one-row ball bearing with only two race wires arranged in non-divided bearing rings and with two-point contact, in which the radius generating the rolling surface of the race ways is always greater than the radius of the balls rolling in these race ways. The two race wires which are preferably made of profiled material and which receive the balls therebetween are arranged in the bearing rings radially with regard to the axis of rotation of the bearing.

8 Claims, 4 Drawing Figures

CENTER-FREE ONE-ROW WIRE BALL BEARING

The present invention relates to a center-free one-row wire ball bearing with only two race wires arranged in undivided bearing rings and with two-point contact while the radius which generates the rolling surface of the race ways is always greater than the radius of the balls rolling on said race ways, especially for journalling a rotatable part of a light structural design.

Bearings of the above mentioned type have become known but they are intended only for purely axial loads.

It is an object of the present invention to provide a bearing which will be able to transmit axial as well as radial forces and also torque loads.

It is another object of this invention to provide a bearing as set forth in the preceding paragraph which will have a light weight and a low rotary resistance, and in which furthermore practically no rotary resistance peak will occur even when the bearing is play-free and non-plane and distortion-sensitive connecting constructions with low self stiffness or rigidity as they are frequently encountered in light constructions. These rotary resistant peaks are caused by the fact that when employing balls, these balls in a braced bearing with more than two race wires roll only between two race wires and slide on the remaining race wires more or less.

The axis of rotation of the balls will in such instance be inclined to the axis of rotation of the bearing. The more or less high slide friction will for instance with reference to a four-point bearing result in an uncontrolled change in the axis of rotation of the balls with changing rolling on 2, 3, or 4 race wires. Such operation can with bearings clamped or braced in an undulated manner occur several times on the circumference.

It is still another object of this invention to provide the bearing completely with balls in order to increase the carrying capability of the bearing.

The customary assembly of a bearing with undivided bearing rings is effected in such a way that the balls are introduced between the rings displaced eccentrically with regard to each other and are subsequently divided over the circumference. According to this method, it is not possible totally to provide the bearing with balls. The distance between the walls is fixed by a comb cage (Kammkäfig).

These objects and other objects and advantages of the invention will appear more clearly from the following specification in connection with the accompanying drawings, in which.

Figure 1:
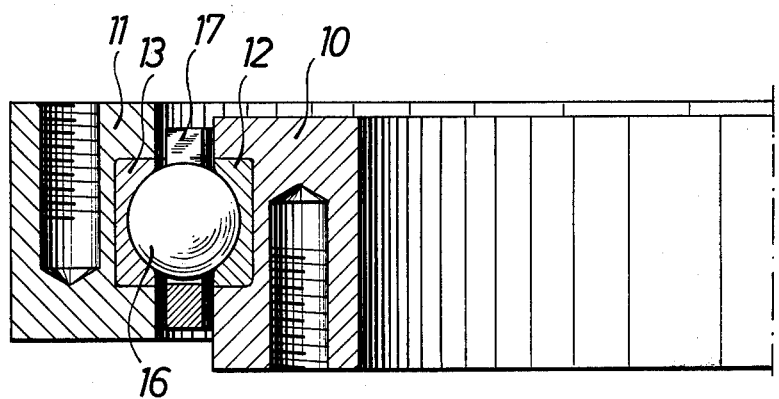
FIG. 1 represents a portion of a longitudinal section of a wire ball bearing with comb-spacer members.

The wire ball bearing according to the present invention is characterized primarily in that the two race wires which receive the balls therebetween and are made of profile material are arranged radially with regard to the axis of rotation of the bearing in the bearing rings — inner ring and outer ring. Expediently, the bearing rings are made of light metal, and the race wires are made of steel, preferably of hardened steel. A particularly advantageous solution of the problems underlying the present invention consists in that one of the two grooves of the bearing rings which grooves receive the race wires is unilaterally provided with a set-back which is followed by an inclined slide surface that reduces the cross section of the respective bearing ring. Furthermore, one of the two race wires has one of its two shoulders located in the groove provided with a rounded portion. The thus designed bearing ring which is provided with a slide surface is while being elastically deformed slipped over the pre-assembled bearing. According to this method for the assembly, play-free and slightly pre-loaded bearings can be produced.

Furthermore, as is well known, a preload can be realized with the design of the bearings according to the invention by cooling the inner ring or by heating the outer ring. When a temperature equalization occurs with the surrounding, a clampingin of the balls in the bearing rings will be realized.

Referring now to the drawings in detail, a center-free one-row wire ball bearing which is insertible for a rotatable part of a light construction (not shown) is composed of two bearing rings namely an inner ring 10 and an outer ring 11 which are respectively detachably connected, for instance by screws, to an unplane not-illustrated connection construction which has only a slight rigidity of its own. Employment instances for such wire ball bearings which transmit axial, radial, and torque loads are for instance rotatable super structures on light vehicles, for the mounting of radar devices, of optical devices, and of airplane parts. Such wire ball bearings furthermore comprise race way wires 12, 13 which are made of profiled material, preferably while using hardened steel and are guided in grooves 14, 15 provided in those sides of the bearing rings 10, 11 which face each other. The shape of the grooves 14, 15 is adapted to the shape of the back sides of the race wires 12, 13. While the back sides of the race wires 12, 13 are straight in the embodiment of FIG. 1, the race wires 12, 13 of FIG. 2 have a back side which is concave toward the outside. The race wire 12 of FIG. 3 has one of its two shoulders rounded at 21.

Figure 2:
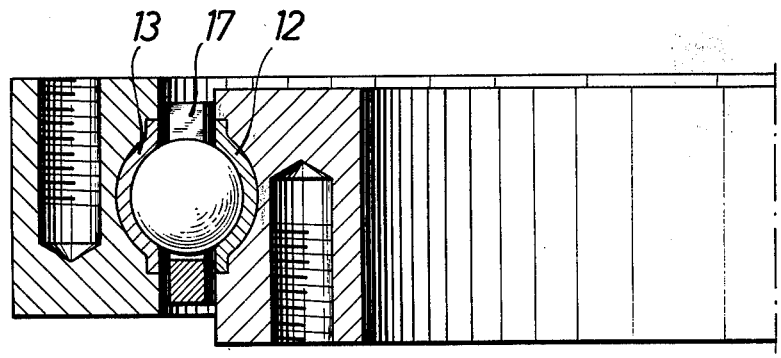
FIG. 2 represents a wire ball bearing according to FIG. 1 with race wires having their back side convexly curved toward the outside.
Figure 3:
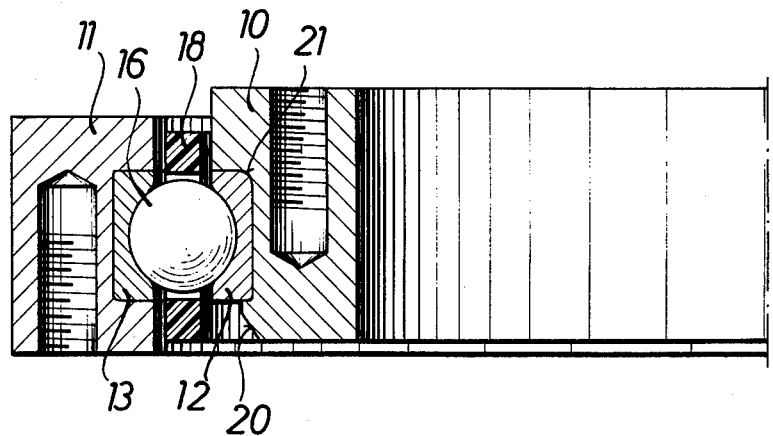
FIG. 3 shows a portion of a longitudinal section of a wire ball bearing with synthetic spacer means and slide surface on the inner ring.
Figure 4:
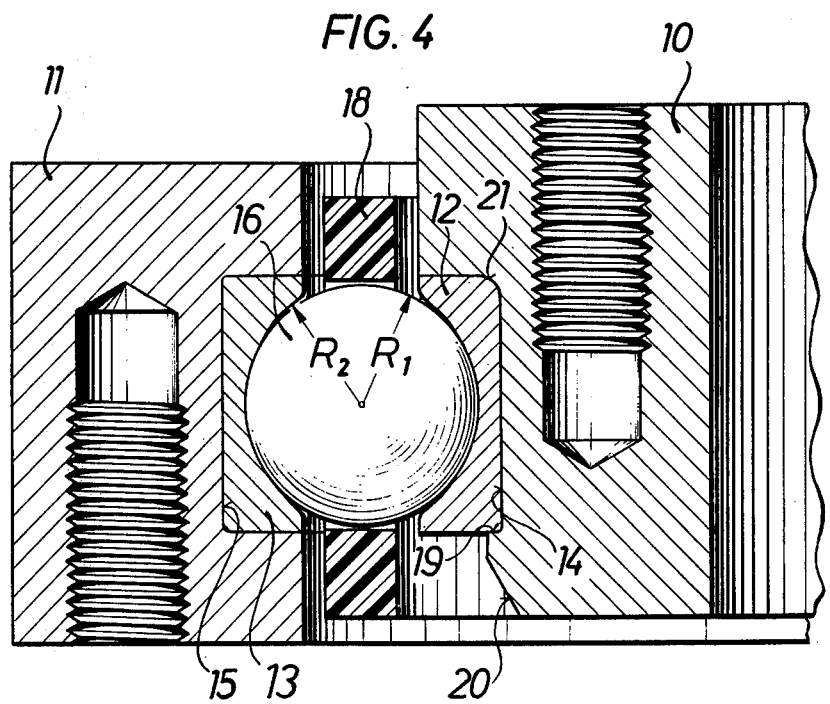
FIG. 4 shows on a larger scale than FIG. 3 the range of the ball contact with the race wires according to FIG. 3.

The balls 16 which due to the different radii of the surfaces corresponding to each other namely the ball surface and the inner surface of the race wire bring about a radial two-way contact in the bearing, may be guided in comb spacers 17 (FIGS. 1,2). The material employed for the comb spacers 17 is preferably of steel or metal sheet. In the embodiment of FIG. 3, a spacer 18 is provided in the form of customary spacer elements and is made of synthetic material.

Generally, the assembly (FIGS. 1,2) is effected in such a way that the balls 16 are introduced into the greater gap of the non-divided bearing rings 10, 11 which are displaceable eccentrically with regard to each other.

The assembly of the wire ball bearing according to FIG. 3 provides that the balls 16 are with spacer members 18 of synthetic material inserted into the outer ring 11 which carries the race wire 13. Subsequently, the race wire 12 is inserted and the inner ring 10 is while being elastically deformed placed above the assembled wire ball bearing. The inner ring 10 has a groove 14 which for purposes of axially fixing the race wire 10 has a set-back 19 which is followed by a slide surface 20 decreasing the cross section of the inner ring 10. The slide surface 20 as well as a rounded area 21 of the upper shoulder of the race wire 12 facilitates the assembly.

As will be evident from the above, the advantage of the wire ball bearing according to the invention consists not only in that by means of the radial two-point contact of the balls with the race wires it is possible to transmit axial, radial and torque loads. In addition thereto, the present invention makes possible the particularly economical production of the wire ball bearing. The wire ball bearing according to the invention also permits a connection with the heat treatment of the bearing rings when inserting sorted balls, and the production of wire ball bearings with any desired play within the prescribed tolerance, as well as with a preload in conformity with the respective requirements.

It is, of course, to be understood that the present invention is, by no means, limited to the specific showing in the drawings, but also comprises any modifications within the scope of the appended claims.

What we claim is:

1. A center-free one-row ball bearing which includes in combination: a one-piece inner bearing ring and a one-piece outer bearing ring arranged in radially spaced relationship and coaxially with regard to each other, only two race wires respectively arranged in said inner ring and said outer ring so as to radially face each other in radially spaced relationship to each other, said race wires being located radially with regard to the axis of rotation of said bearing, and a plurality of balls arranged radially between and in rolling contact with said two race wires, those surfaces of said race rings which face each other respectively forming uninterrupted raceways for said balls, the radius of said raceways always being greater than the radius of said balls rolling on said raceways so that the balls have a twopoint contact with their raceways.

2. A bearing in combination according to claim 1, in which said race wires are made of profiled material.

3. A bearing according to claim 1, in which said bearing in combination rings are of light metal, and in which said race wires are of steel.

4. A bearing in combination according to claim 3, in which said race wires are of hardened steel.

5. A bearing in combination according to claim 1, in which each of said bearing rings has an annular groove, and in which said race wires are respectively arranged in said grooves, the groove in one of said bearing rings being unilaterally defined by a reduced side wall having adjacent thereto an inclined slide surface decreasing the cross section of said one bearing ring.

6. A bearing in combination according to claim 5, in which one of said two race wires has one of its shoulders arranged at the bottom of the groove therewith in the bearing ring therewith provided with a rounded area.

7. A method of preassembling a wire ball bearing comprising balls, two race wires, spacer members for the balls and an outer and inner bearing ring each of which has an annular groove with an annular race wire therein, one of said grooves only having a lateral side wall reduced over the other side wall of the same groove, which includes in combination the improvement step of elastically deforming and introducing the bearing ring with the reduced groove defining lateral side wall into the other bearing ring.

8. A method in combination according to claim 7, which includes the steps of: following the preassembly of said race wires with said spacer members and said balls changing the temperature of one of said bearing rings relative to the other bearing ring and assembling that bearing ring the temperature of which has been changed relative to the other bearing ring.

* * * * *